INVENTORS
DAVID W. GRIMM,
EMRIC W. BERGERE,
JACK RATH
BY T. L. Slam
ATTORNEY

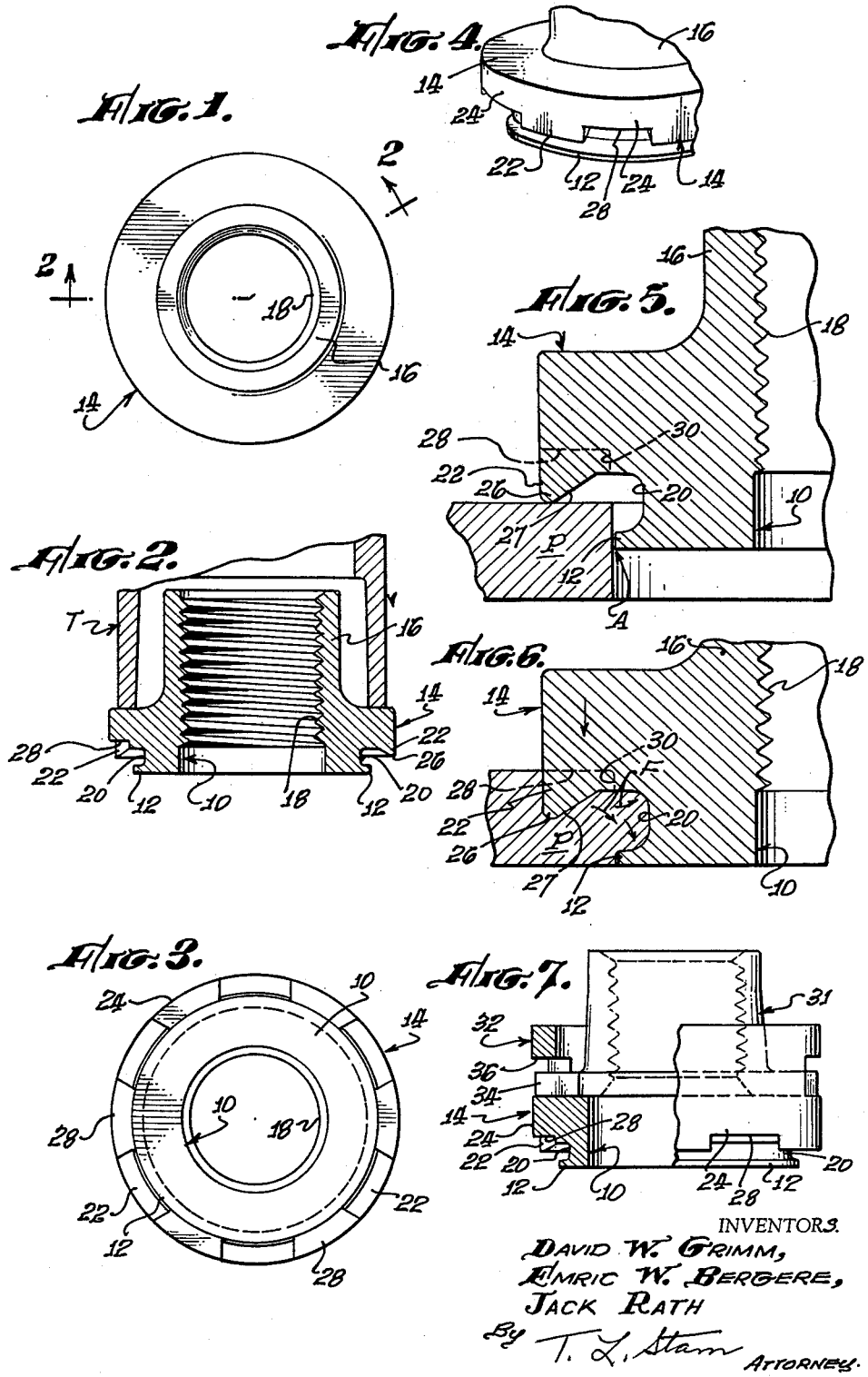

United States Patent Office 3,133,579
Patented May 19, 1964

3,133,579
SELF-STAKING FASTENER HAVING ALTERNATE TEETH AND LANDS
David W. Grimm, Emric W. Bergere, and Jack Rath, Pico-Rivera, Calif., assignors to Kaynar Mfg. Co., Inc., Pico-Rivera, Calif., a corporation of California
Filed Nov. 10, 1960, Ser. No. 68,410
3 Claims. (Cl. 151—41.73)

This invention relates to means for attaching structural elements to plates or panels, and more specifically to self-staking means for attaching elements into apertures in sheet metal plates or panels, such means being of the type wherein a portion of the element is inserted into an aperture in the plate and other portions of the element are staked into the material of the plate around the aperture to effect a connection of the element to the plate.

Staking arrangements of the type under consideration may obviously be used to attach grommets, bushings, lugs, bolts, rivets, nuts or similar structural elements to panels or plates, and it is considered that the present invention is as readily applicable to any one of these structural forms as to any of the others. The present invention is particularly directed to attachment means of this general type wherein no auxiliary attaching means are required and provides improved structural means for effecting such attachment. Actually, there are two competitive types of such devices, and these are herein designated as "clinching" and "staking" types.

The so-called "clinching" type is herein denoted as meaning that type of connection wherein the structural element has an overhanging flange at one end of a body portion which is inserted through a close fitting aperture in a plate with the flange externally situated at one side of the plate, and wherein the opposite end of the body portion is turned over to effect a clinching of the plate by the change of shape of the structural element. "Clinching" types of connections require pressure to be applied to both sides of the element to be attached, and generally require the element to extend through the plate, as with rivets or eyelets.

The so-called "staking" type is usually formed with a guide portion adapted to closely fit within a bore or a counterbore and an enlarged swaging flange of such configuration and hardness that, when the enlarged flange is driven into the panel surface, the material of the plate or panel will flow into a recessed area in or under the enlarged flange to effect a connection. The "staking" type is advantageous in that it may be used in counterbores, in that it may not require bucking tools, and in that the relative thickness of the plate or panels is not critical as with "clinching" types of connections and particularly to self-staking devices wherein forces applied in an insertion direction cause the device to stake itself to the base material.

It is characteristic of self-staking devices of the class under discussion that they include some means of providing a recess of reduced diameter in the general area of the attachment of the guide portion to the enlarged swaging flange and that this recess takes the form either of an annular groove or an upwardly diverging taper into which base material is forced as described above. It is further characteristic of such devices that the overhanging swaging flange is irregular in shape so that turning and loosening in the opening is inhibited and so that elements so connected may be threaded (prior to installation) for cooperation with threaded parts in making connections to the plate without danger of loosening due to torque.

Some types of prior art self-staking devices incorporate no positive stop means. That is, the swaging flange, of irregular shape, as described above, extends to the end of the piece so that the element may be driven insufficiently or too far, and sometimes through the plate. Other types do provide positive stop means, which are generally in the form of an enlarged shoulder overlying the swaging flange but this is disadvantageous in increasing the bulk and the weight of the part. Thus, prior art arrangements were disadvantageous in that they either had no positive stop or were unduly bulky and heavy. The present invention overcomes this disadvantage by providing positive stop means which are within or only slightly outside the perimeter of the swaging flange and serve as visual and physical indications of the fact that the element is properly staked in position.

Generally, the prior art staking means comprise a star-shaped or knurled configuration of the swaging flange which may or may not be inclined downwardly and outwardly at its lower surface and which may or may not have relatively small sharpened points. It is characteristic of such configurations that they cut through the base material and cause movement or flow of material only under the points of the configuration and no provision is made for flow of material to the sides of the points to fill the recess under the swaging flange. It follows therefore that the relatively small points are each an area of potential weakness in the staked connection. The present invention overcomes this disadvantage by providing a staking arrangement wherein relatively large peripheral segments of the enlarged head are alternately utilized for swaging and for stop means, and wherein the relative sizes of the parts are so chosen as to assure flow of base material into the spaces in the recess under the enlarged head which are between adjacent swaging flanges, thus providing improved resistance to torque-out and push-out forces.

Thus, the present invention provides self-staking means which include positive stop means without increasing the bulk or weight of the structure and which include means for providing greater resistance against push-out and torque-out forces.

While devices as discussed above have many utilities and applications, the examples chosen for illustration herein are nut elements, and it is one of the objects of this invention to provide improved stake nut constructions.

It is, therefore, an object of this invention to provide improved self-staking means for attaching structural elements to panels or plates.

Another object of the present invention is to provide stake nut constructions having positive stop means and which are of lesser bulk and weight than prior known stake nuts having positive stop means.

A further object of the present invention is to provide improved self-staking means of the class described which have improved characteristics of resistance to push-out and torque-out forces.

Yet another object of the present invention is to provide self-staking nuts including positive stop means wherein the stop function is performed by surfaces within the perimeter of the staking teeth.

Other objects and the attendant advantages will become apparent in the following specification when read in conjunction with the following drawing, wherein like reference numerals have been applied to like parts throughout and wherein:

FIGURE 1 is a plan view of a stake nut according to the present invention;

FIGURE 2 is a section along the line 2—2 of FIGURE 1 showing a driving or staking tool in relation thereto;

FIGURE 3 is a bottom view of the stake nut of FIGURE 1;

FIGURE 4 is a fragmentary perspective view of a portion of the stake nut shown in FIGURES 1, 2 and 3, illustrating the land and tooth construction of staking devices according to the present invention;

FIGURE 5 is an enlarged fragmentary section of the stake nut of FIGURES 1 to 4, taken through one of the staking teeth and showing the stake nut in position above a plate of base material prior to the application of staking forces;

FIGURE 6 is a view similar to FIGURE 5, showing the parts in the staked condition;

FIGURE 7 is a front elevation, partly in section, of another form of stake nut according to the present invention;

Figure 8:
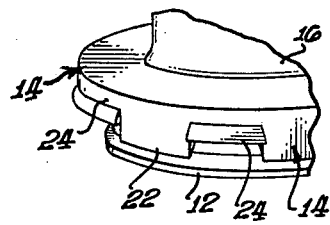
FIGURE 8 is a view similar to FIGURE 4, illustrating another modification of the present invention.

As has been previously mentioned, the self-staking device disclosed and claimed herein is adapted to be used with a wide variety of structural elements and is shown in the drawing in stake nut applications solely by way of illustration of the principles of the invention.

Referring now to the drawing, the stake nut illustrated in FIGURES 1 to 6 comprises a unitary body having a guide portion 10, a staking portion 14, and a nut barrel 16. The guide portion 10 is adapted to relatively closely fit into an aperture A in a plate or panel P (see FIGURES 5 and 6), and includes an annular ridge or flange 12 at its end for this purpose. The staking portion is designated generally by the reference numeral 14 and is integral with and of greater diameter than the guide portion whereby its outer edges will engage the surfaces of the plate P around the aperture A. The nut barrel 16 extends upwardly from the staking portion 14, as shown in the drawing, and is integral with the staking portion in the FIGURES 1 to 6 adaptation of the present invention. The unitary structure has a through bore, as shown, and is internally screw threaded, as at 18.

Underlying the staking portion 14 and above the guide portion 10 is an annular inwardly directed peripheral groove or recess 20 for a purpose to be later described.

The staking portion 14 has a series of alternately spaced teeth 22 and lands 24 at its outer edge, extending entirely around the outer edge thereof, as best seen in FIGURES 1, 3 and 4. Teeth 22 have points 26 extending downwardly and slightly overlying the groove 20, the teeth 26 having an upwardly and inwardly inclined inner surface 27 and a longitudinally directed outer surface. The lands 24 do not extend farther radially outwardly than teeth 22 and have flat bottom surfaces 28 adapted to engage the surface of plate P to form a positive stop for the staking device during installation. The flat stop surfaces 28 are axially and radially offset from the groove 20 which latter extends beyond the points 26 of the teeth nearer to the inner end of the nut body than the points of the teeth for the purpose hereinafter fully described.

It is necessary that any staking construction according to the present invention be of harder material than that of the base material to which it is desired that an attachment be made. Such hardness may be derived by choice of materials and/or by appropriate treatment of the materials of which the staking construction is made.

In operation, a stake nut according to the present invention is positioned in an aperture A in a plate P, with the enlarged staking area resting upon the top of the plate as shown in FIGURE 5. It is staked into the surface of the plate by application of downward force thereto as by a tool T, shown in FIGURE 2. Upon the application of such force, the teeth 22 dig into the surface of the plate and the surfaces 27 thereof push the material of the plate or cause such material to flow into the recess 20, as shown by the arrows F in FIGURE 6. The driving force and downward movement is continued until the surfaces 28 of the lands 24 engage the top surface of the plate P to serve as a positive stop and as a visual indication that the staking device is completely driven home, to the position shown in FIGURE 6. In this position, it should be noted, the material pushed or flowed into recess 20 will resist relative axial movement of the stake nut, while the alternate nature of the lands and teeth resist turning due to the application of torque to the nut. It should be noted that the relative angularity of surfaces 27 and of the outer surfaces of teeth 22 are such that very little flow of metal takes place in an outward direction.

It is a feature of the present invention that affirmative provision is made to insure that sufficient base material flows into the recess 20 to assure a staking result which will adequately resist push-out. To this end, it is essential that the volume of the teeth 22 embedded in the base material be greater than that of the portion of the recess 20 which is directly under the teeth in the installed position of the device. The volume of material displaced by teeth 22 is directly controlled, for the full installed position of the device, by the height of the bottom walls 28 of the lands above the recess or groove 20, since this controls the depth to which teeth 22 extend into the base material and the amount of material displaced into recess 20 by the teeth. For purposes of rough analysis, if the area bounded by the tooth outline below the stop wall 28 and by the dotted line 30 (which represents the inner outline of land 24) is equal to the planar area of a radial section through the recess 20, the tooth will displace enough material to fill the recess under the tooth. It is a feature of this invention that the first mentioned area is made larger than the planar area of a radial section through recess 20, as shown in FIGURES 5 and 6, so that the teeth displace more material than necessary to fill the recess under the teeth and cause flow laterally between the teeth into portions of the recess 20 which underlie the lands, in order to give improved push-out resistance. Otherwise stated, the present invention provides structures wherein the stop means are so positioned that the embedded volume of the teeth, in the fully staked position, exceeds the volume of those portions of the recess 20 which underlie the teeth so that base material will flow laterally as well as radially into the recess.

FIGURE 7 illustrates another stake nut modification according to the present invention, wherein the nut element is a separate piece and is floatingly held relative to the staking portion of the assembly. Such arrangements are commonly utilized in applications where bolt holes in plates intended to be secured to one another may be slightly misaligned and it is desirable to provide means for floating alignment of the nut elements on assembly. In floating stake nut arrangements, a nut retaining portion or "basket" 32 is formed integrally with the staking portion, and a nut element 31 is floatingly retained in the basket by providing loosely fitting interengaging means on the basket and on the nut. In the illustrated example, the nut element has lugs 34 extending laterally from its base and the basket has slots 36 in which said lugs are retained. The slots are wider than the lugs 34 and are of greater extent in an axial direction than the thickness of the lugs, to provide float in all directions. It is a feature of this modification that the slots 36 on the basket element 32 are so positioned that they do not overlie any staking teeth 22. Thus, when staking force is applied, there are no direct longitudinal forces acting to collapse the basket in the slot area since the lands 24 under the slots are not in contact with the surface of the plate until the staking action is completed.

It is an important feature of the present invention that the positive stop function is accomplished by surfaces within the outer perimetral dimension of the staking teeth. This makes it possible, for the first time, to provide self-staking devices with affirmative stop means without increasing the size and bulk of such devices to greater size and bulk than are necessary if no affirmative stop means are provided. The staking devices of FIGURES 1 to 7 are illustrative of the maximum size and weight advantage to be derived from relying on internally positioned stop lands since those devices have no increase whatever in lateral dimensions as a result of the provision of the stop means.

Figure 9:
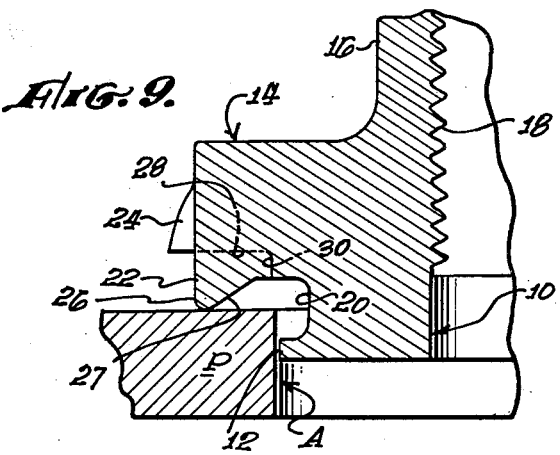
FIGURE 9 is an enlarged fragmentary section of the stake nut of FIGURE 8, taken through one of the staking teeth and showing the stake nut in position over a plate of base material prior to the application of staking forces.
Figure 10:
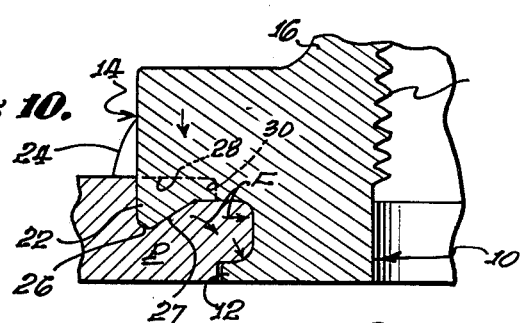
FIGURE 10 is a view similar to FIGURE 9, showing the stake nut of FIGURES 8 and 9 in staked position.

The basic premise, however, lends itself to advantages and improvements in self-staking devices, whether or not the staking and stop area contains portions extending outwardly of the staking teeth. Such advantages may be in simplified forming methods or in the provision of outwardly extended portions of the lands which are much less than required in prior art constructions. Referring now to FIGURES 8, 9 and 10, there is illustrated therein a modification of the present invention which lends itself to a simple manufacturing technique and has only an incidental and slight protuberance of stop surfaces outwardly of the perimeter of the staking teeth.

In the formation of the stake nut of FIGURES 8, 9 and 10, the blank is formed with the annular recess and generally enlarged staking portion but the staking portion has a cylindrical outer wall in the form of the profile shown in section in FIGURES 5 and 6, i.e., a continuous annular tooth and has no lands 24. The lands 24 are then formed by pushing up the metal in spaced segments from the shape of the tooth as at 22 in FIGURE 5 (or in FIGURE 9) to the shape of the land as at 24 in FIGURES 8, 9 and 10. A further comparison of these shapes may be made by referring to FIGURE 8, which clearly shows the outlines of the lands and teeth respectively. It follows then that the positive stops are formed from material which is no greater in bulk or weight than a staking tooth of equivalent area.

The principle and mode of operation of the self-staking action of the modification of FIGURES 8, 9 and 10 are precisely those of the structures of FIGURES 1 to 7. It should be noted that the surfaces 28 are mainly inside the perimeter of the staking teeth 22 so that substantially all the stop function is performed by such internal surfaces and that the slight protrusion of lands 24 in this case is merely incidental to the manufacturing procedure as described herein.

From the above it should be obvious that staking constructions as described herein provide advantages over prior known devices in that improved resistance to torque-out and push-out forces are provided with minimum weight and bulk; in that positive stop means are provided without appreciable enlargement of the bulk over that which would be involved without positive stop means; and in other respects discussed in the specification.

As has been previously stated, self-staking constructions according to the present invention may be applied to a wide variety of structural elements and the specific illustrations of stake nut constructions are by way of example only and are not intended to be limiting. Moreover, the specific shape and form of parts of the staking arrangement disclosed herein are obviously subject to wide variation in size and shape, in the materials used, and in the manner of manufacture. Accordingly, it is to be understood that the present invention is not to be limited by the specific illustrative examples shown and described herein but rather by the scope of the following claims.

What is claimed is:

1. Self-staking fastening means comprising a unitary member having an axially extending annular guide portion, a staking portion spaced longitudinally from said guide portion and of greater lateral size than said guide portion, a peripheral annular groove above said guide portion and underlying said staking portion, said groove being defined by circumferentially continuous radially extending top and bottom walls, said groove having internal dimensions smaller than those of said staking portion, said staking portion comprising circumferentially spaced staking teeth on the periphery of said staking portion, and circumferentially spaced lands between said teeth, said lands terminating in radially extending stop surfaces spaced axially above the top wall of said groove, said staking teeth terminating at points axially below said top wall of said groove and above said bottom wall of said groove, at least the major portion of said surfaces being within the outer peripheral dimension of the staking teeth and serving to limit the penetration of the staking portion into the material of the plate.

2. Self-staking fastening means according to claim 1, wherein said stop surfaces extend slightly outwardly beyond the peripheral dimension of said teeth, the material above said stop surfaces outwardly of said teeth comprising arcuate ribs having their ends substantially aligned with the adjacent side edges of adjacent teeth.

3. A floating stake nut fastener comprising a unitary self-staking basket and a nut element floatingly retained in said basket; said basket having an upstanding annular wall at one end thereof providing a pocket for a nut element, said wall having opposite slots therein, said nut element having a base flange with outwardly extending ears, said ears being retained in said slots and being of less thickness than the height of said slots and of less width than the width of said slots whereby said nut is floatingly retained in said basket, the opposite end of said self-staking basket having an axially extending annular guide portion for insertion into a closely fitting aperture in a plate and a staking portion spaced longitudinally from said guide portion, a peripheral annular groove above said guide portion and underlying said staking portion, said groove being defined by circumferentially continuous radially extending top and bottom walls, said groove having internal dimensions smaller than those of said staking portion, said staking portion comprising circumferentially spaced staking teeth on the periphery of said staking portion, and circumferentially spaced lands between said teeth, said lands terminating in radially extending stop surfaces spaced axially above the top wall of said groove, said staking teeth terminating at points axially below said top wall of said groove and above said bottom wall of said groove, at least the major portion of said surfaces being within the outer peripheral dimension of the staking teeth and serving to limit the penetration of the staking portion into the material of the plate, said slots overlying opposed pairs of stop surfaces whereby staking forces transmitted through said annular wall adjacent said slots will not tend to collapse said slots.

References Cited in the file of this patent

UNITED STATES PATENTS

| 1,842,117 | Renshaw | Jan. 19, 1932 |
| 1,946,064 | Creveling | Feb. 6, 1934 |
| 2,358,728 | Miller | Sept. 19, 1944 |
| 2,361,979 | Tarwater et al. | Nov. 7, 1944 |
| 2,404,372 | Hallock | July 23, 1946 |
| 2,486,769 | Watson | Nov. 1, 1949 |
| 2,986,188 | Karp et al. | May 30, 1961 |
| 3,074,292 | Polmon | Jan. 22, 1963 |
| 3,079,970 | Barry | Mar. 5, 1963 |

FOREIGN PATENTS

| 370,948 | Great Britain | Apr. 8, 1932 |
| 1,178,030 | France | Mar. 4, 1959 |